US012596730B2

(12) United States Patent
Nomula et al.

(10) Patent No.: US 12,596,730 B2
(45) Date of Patent: Apr. 7, 2026

(54) SYSTEM TO ASSIST USERS OF A SOFTWARE APPLICATION

(71) Applicant: Voicemonk Inc., Sunnyvale, CA (US)

(72) Inventors: Jagadeshwar Nomula, Fremont, CA (US); Vinesh Gudla, Pleasanton, CA (US)

(73) Assignee: Voicemonk, Inc., Sunnyvale, CA (US)

( * ) Notice: Subject to any disclaimer, the term of this patent is extended or adjusted under 35 U.S.C. 154(b) by 0 days.

(21) Appl. No.: 17/346,243

(22) Filed: Jun. 13, 2021

(65) Prior Publication Data

US 2021/0303607 A1    Sep. 30, 2021

Related U.S. Application Data

(63) Continuation of application No. 15/391,837, filed on Dec. 27, 2016, now abandoned, which is a continuation-in-part of application No. 15/356,512, filed on Nov. 18, 2016, now Pat. No. 11,068,954.

(60) Provisional application No. 62/318,762, filed on Apr. 5, 2016, provisional application No. 62/275,043, filed on Jan. 5, 2016, provisional application No. 62/257,722, filed on Nov. 20, 2015.

(51) Int. Cl.
*G06F 16/3329* (2025.01)

(52) U.S. Cl.
CPC ................................. *G06F 16/3329* (2019.01)

(58) Field of Classification Search
CPC ...................... G06F 16/3329; G06F 16/33295
USPC ......................................................... 707/723
See application file for complete search history.

(56) References Cited

U.S. PATENT DOCUMENTS

| | | | | |
|---|---|---|---|---|
| 6,665,640 B1 * | 12/2003 | Bennett | .................... | G09B 5/04 |
| | | | | 704/E15.04 |
| 8,095,419 B1 * | 1/2012 | Kapur | ................ | G06Q 30/0218 |
| | | | | 705/14.2 |
| 8,239,206 B1 * | 8/2012 | LeBeau | ............... | G10L 15/1822 |
| | | | | 707/769 |
| 10,147,037 B1 * | 12/2018 | Podgorny | .............. | G06N 5/022 |
| 10,222,942 B1 * | 3/2019 | Zeiler | .................... | G06N 5/022 |
| 2005/0010553 A1 * | 1/2005 | Liu | ......................... | G06F 16/58 |
| 2006/0282317 A1 * | 12/2006 | Rosenberg | ......... | G06Q 30/0269 |
| | | | | 705/14.66 |
| 2007/0067309 A1 * | 3/2007 | Klein | ....................... | G06F 16/45 |
| 2007/0293247 A1 * | 12/2007 | Bhat | .................... | H04L 51/214 |
| | | | | 455/466 |
| 2010/0275224 A1 * | 10/2010 | Sheng | ................ | H04N 21/4622 |
| | | | | 704/251 |

(Continued)

*Primary Examiner* — Vaishali Shah
(74) *Attorney, Agent, or Firm* — Kumar Maheshwari; Mahesh Law Group PC

(57) ABSTRACT

A system configured to assist users of a software application is provided. The system includes a virtual agent server 100 configured to receive input that identifies a primary user and at least one secondary user, wherein the primary user and the secondary user are parties to an event. Further, the virtual agent server 100 receives input identifying one or more preferences of the primary user and the secondary user corresponding to one or more categories of preferences. The virtual agent server 100 then assigns relative weightage to preferences within a category among categories of preferences. Subsequently, the virtual agent server 100 generates one or more suggestions corresponding to the event based on the relative weightage.

20 Claims, 10 Drawing Sheets

(56)     References Cited

U.S. PATENT DOCUMENTS

| | | | | |
|---|---|---|---|---|
| 2011/0153718 A1* | 6/2011 | Dham | H04L 69/22 | 709/203 |
| 2012/0035948 A1* | 2/2012 | Borton | G16H 80/00 | 705/2 |
| 2012/0296972 A1* | 11/2012 | Backer | G06F 3/0481 | 709/204 |
| 2013/0042123 A1* | 2/2013 | Smith | G06F 9/5077 | 713/300 |
| 2013/0226997 A1* | 8/2013 | Lee | G06F 9/4843 | 709/213 |
| 2014/0164305 A1* | 6/2014 | Lynch | G06Q 30/0201 | 706/46 |
| 2014/0222429 A1* | 8/2014 | DeLand | H04L 51/046 | 704/251 |
| 2014/0236578 A1* | 8/2014 | Malon | G06F 40/40 | 704/9 |
| 2015/0033144 A1* | 1/2015 | Kim | H04L 67/75 | 715/752 |
| 2016/0026869 A1* | 1/2016 | Rekimoto | G06F 16/68 | 345/633 |
| 2016/0140310 A1* | 5/2016 | Jiao | G09B 7/00 | 705/2 |
| 2016/0330145 A1* | 11/2016 | Patel | H04L 51/216 | |
| 2016/0357853 A1* | 12/2016 | Moore | G06F 16/3344 | |

* cited by examiner

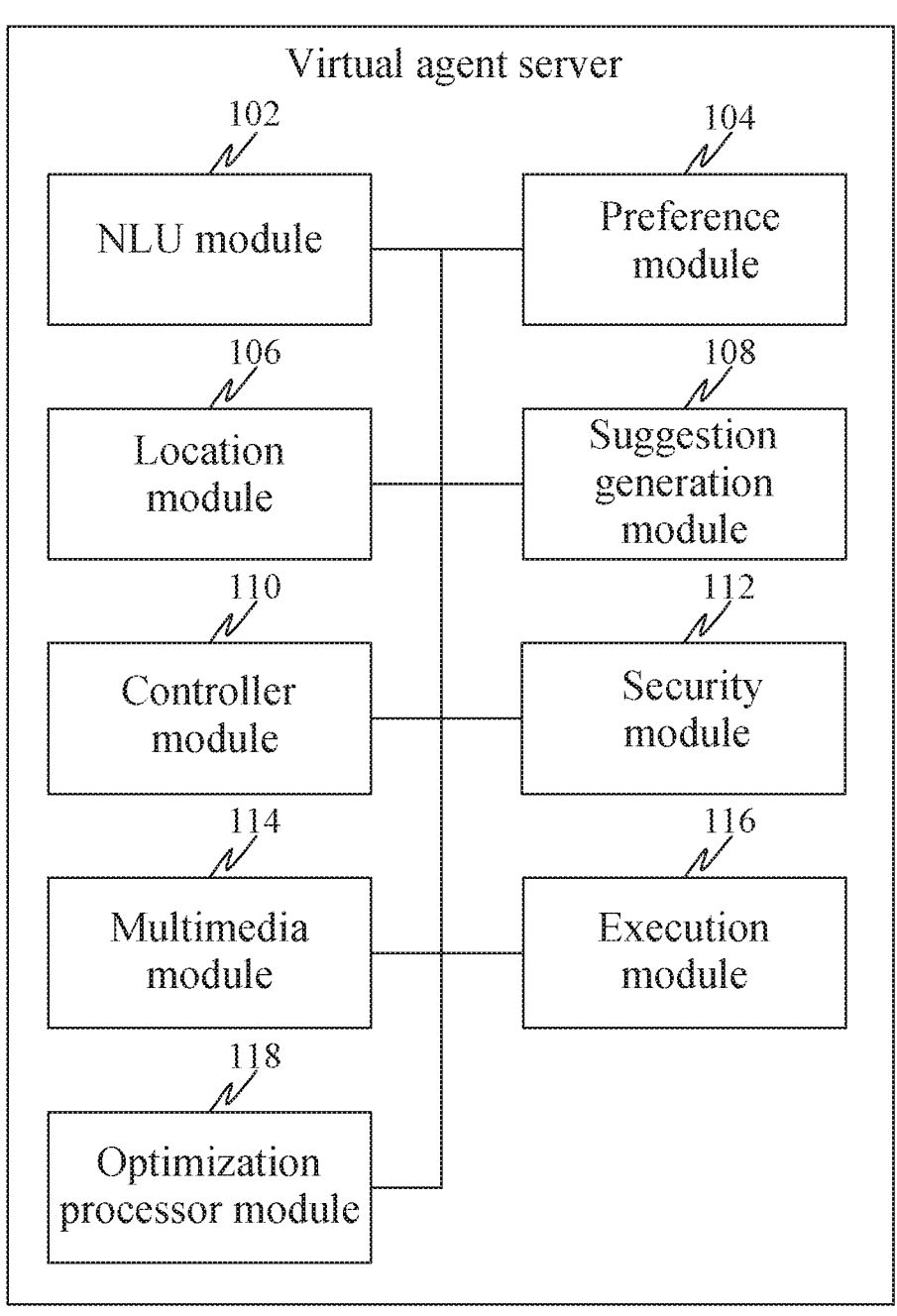
FIG. 1

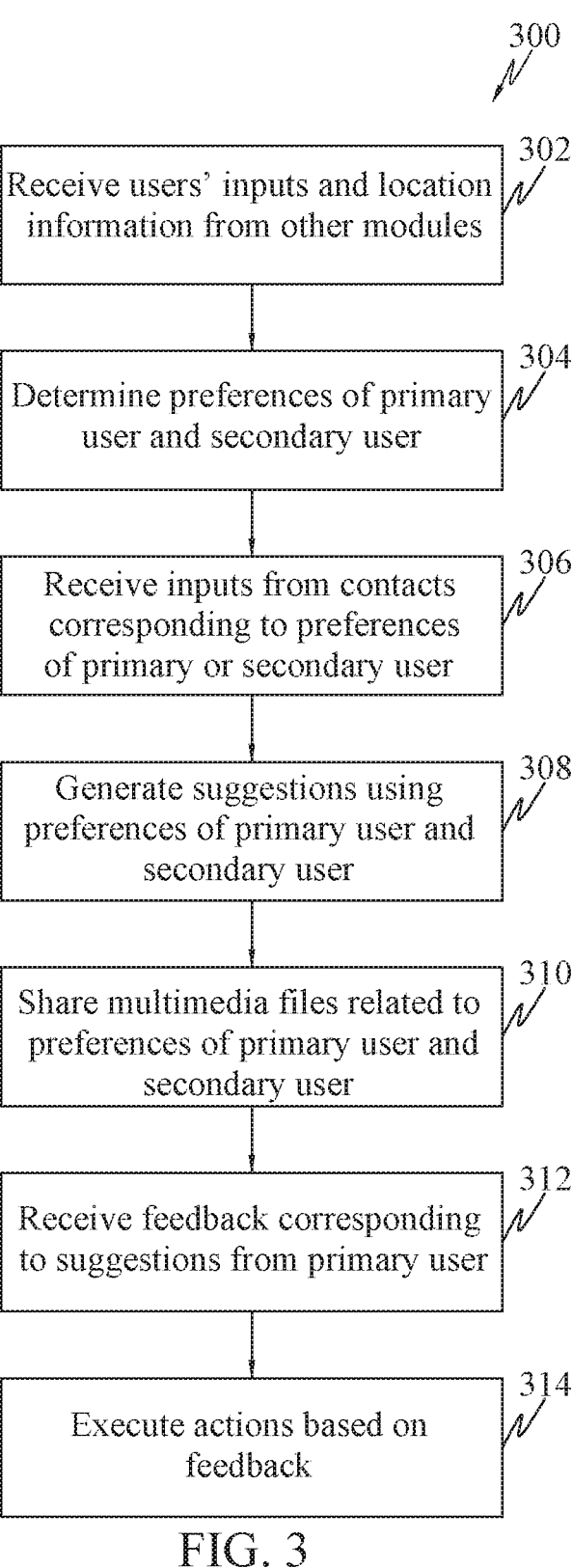

300

302

Receive users' inputs and location information from other modules

304

Determine preferences of primary user and secondary user

306

Receive inputs from contacts corresponding to preferences of primary or secondary user

308

Generate suggestions using preferences of primary user and secondary user

310

Share multimedia files related to preferences of primary user and secondary user

312

Receive feedback corresponding to suggestions from primary user

314

Execute actions based on feedback

FIG. 3

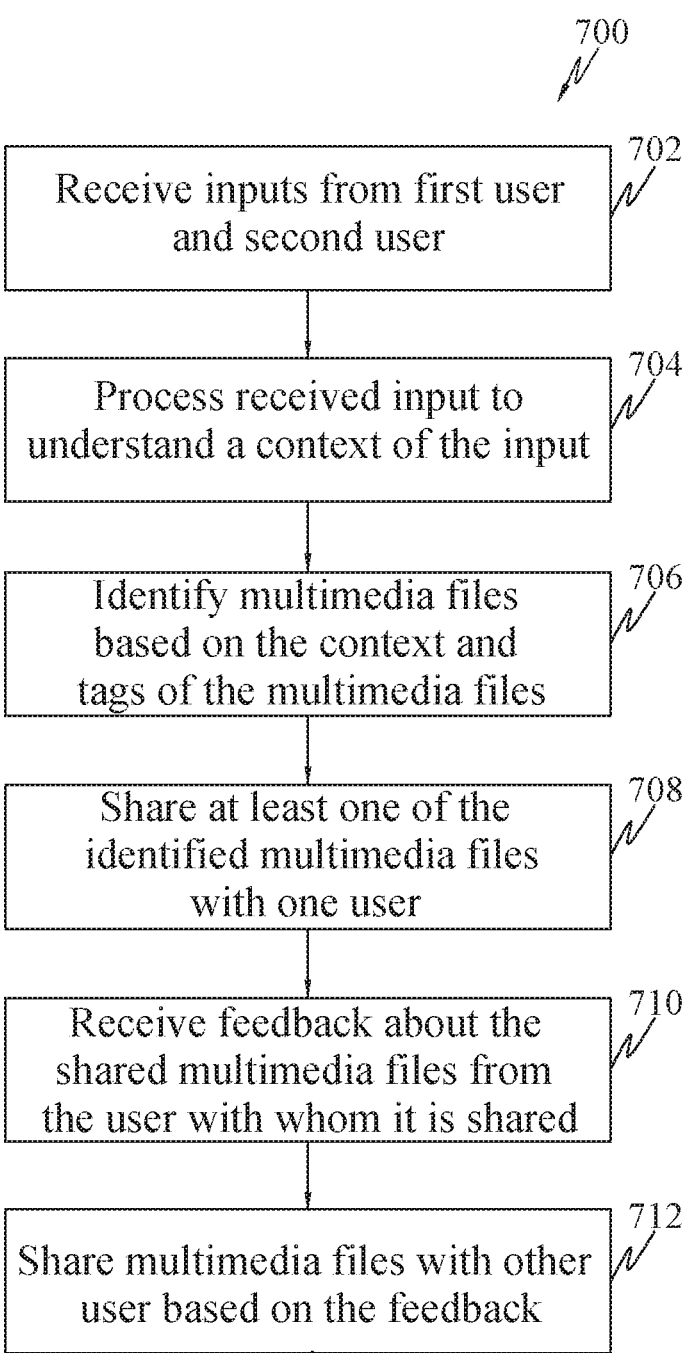

700

702
Receive inputs from first user
and second user

704
Process received input to
understand a context of the input

706
Identify multimedia files
based on the context and
tags of the multimedia files 708
Share at least one of the
identified multimedia files
with one user 710
Receive feedback about the
shared multimedia files from
the user with whom it is shared 712
Share multimedia files with other
user based on the feedback

FIG. 7

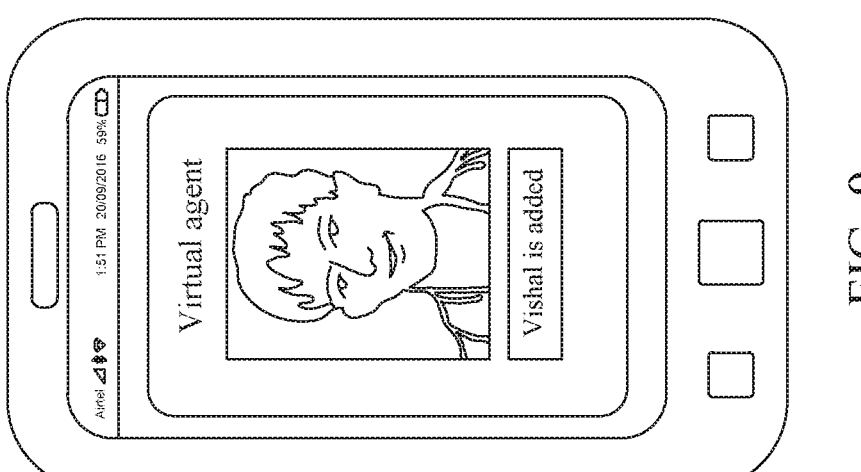
FIG. 9
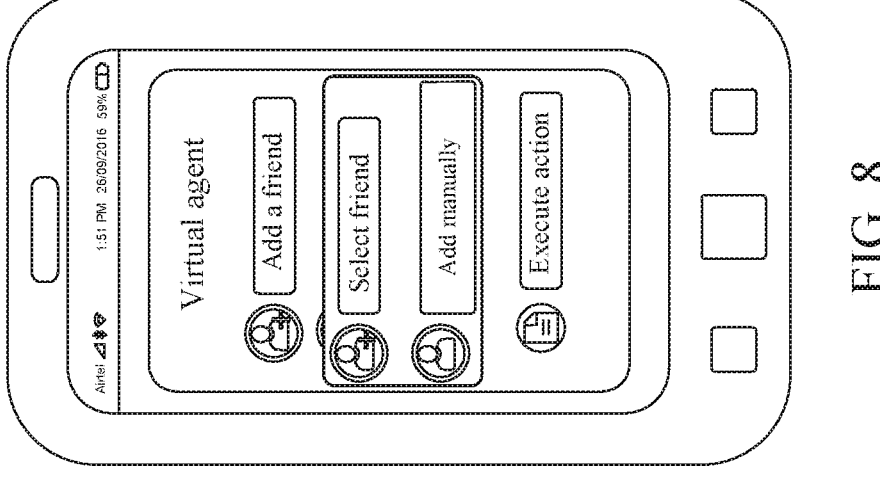
FIG. 8

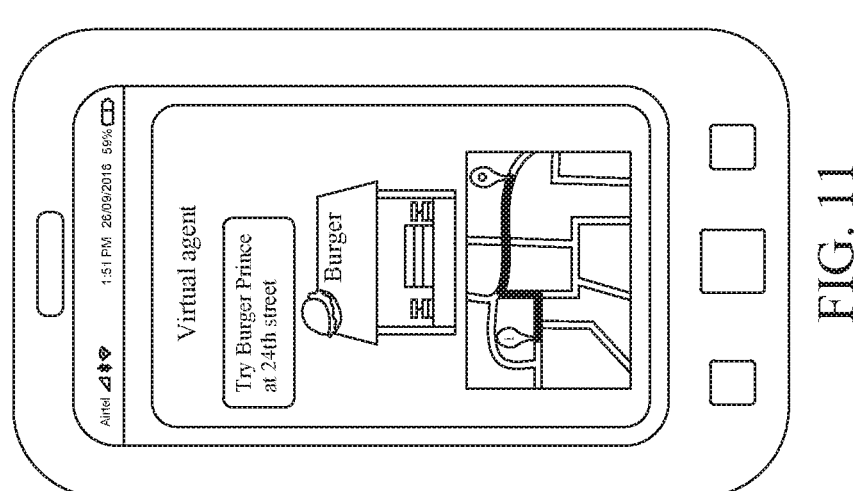
FIG. 11
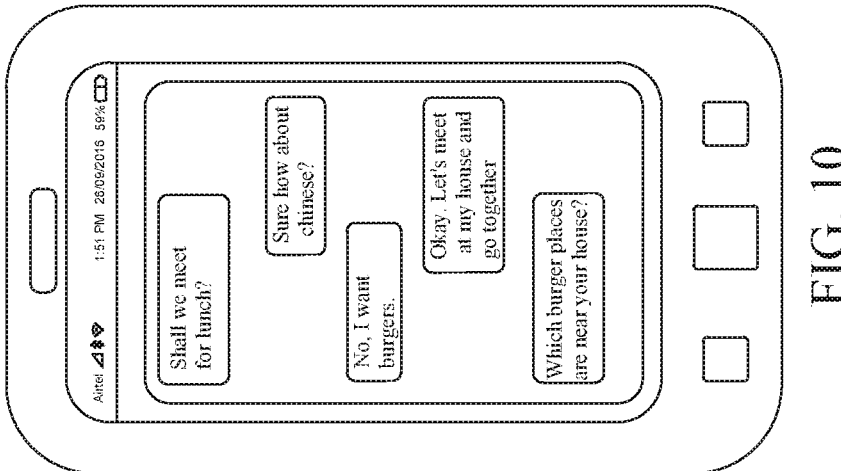
FIG. 10

SYSTEM TO ASSIST USERS OF A SOFTWARE APPLICATION

CROSS-REFERENCE TO RELATED APPLICATION

This application claims priority under 35 U.S.C. § 120 as a continuation of currently pending U.S. patent application Ser. No. 15/391,837 filed Dec. 27, 2016, which is a continuation-in-part of currently pending U.S. patent application Ser. No. 15/356,512 filed Nov. 18, 2016, which is a non-provisional application claiming the benefit under 35 U.S.C. § 119(e) of Provisional Patent Application Nos. 62/257,722, 62/275,043 and 62/318,762 filed Nov. 20, 2015, Jan. 5, 2016 and Apr. 5, 2016, respectively. The entire disclosures of all said applications are thereby incorporated by reference.

BACKGROUND

Field of Invention

The subject matter in general relates to the field of virtual assistant systems. More particularly, but not exclusively, the subject matter relates to a virtual assistant system that makes suggestions and executes actions corresponding to events in which preferences of multiple entities matter.

Discussion of Related Art

In our day-to-day lives we face many situations that require coordination between multiple people. However, multiple opinions arise when there are multiple people, and it becomes tough to come up with recommendations that are suitable to everyone's taste, resulting in a lot of time, effort and coordination needed to come to a decision which is acceptable by everyone. Conventional systems are incapable of making suggestions and executing actions corresponding to events in which preferences of multiple entities matter. Also, there are no provisions to take tastes and opinions of multiple people into consideration. Further, there are no systems which may help the users in fulfilling the actions that were selected based on preferences of multiple people.

Customers who wish to place an order, complete a transaction or clear doubts regarding a product or a service generally try to contact the customer service of the respective organization. Customers' communication with call centers mostly take place over phone calls or e-mails and frequently leads to confusions and errors in communication between the customer and the call center representative, especially with communication network issues, bearing issues and misinterpretation of instructions related to functioning/use of products. Further, there are instances where the call center representative may not understand the needs or requirements of the customer, which leaves them unable to help the customer. Such situations lead to customer dissatisfaction and often result in bad reviews and complaints made by the customer regarding the organization.

Conventional systems do not help customers when they face confusions while trying to communicate with a call center representative. Further, there is no provision to support and help the call center representative in case they need further help while communicating with the customer.

Further, in conventional systems, customers talk to the customer service of the business on the phone. Therefore, the current customer service experiences are restricted to a communication wherein the customer can only hear an agent's speech on a telephone line. Such voice based communication has limitations in terms of how well one can express and address issues, and how well one can interpret and understand information presented through such communication.

An image and/or video are worth 1000 sentences. However, the current customer service experiences are restricted to a communication wherein the user can only hear an agent's speech on a telephone line.

Thus, the conventional systems failed to solve the above problems, which result in inconveniences to planners and people who are coordinating between multiple persons. Further, with the current increase in the coordinated work between multiple people at residences, offices and other campuses, it is of prime importance to have improved systems.

SUMMARY

Accordingly, an improved technique to overcome the above problems is needed. To fulfil this need, a system configured to assist users of a software application is provided. The system comprises a virtual agent configured to receive input that identifies a primary user and at least one secondary user, wherein the primary user and the secondary user are parties to an event. Further, the virtual agent receives input identifying one or more preferences of the primary user and the secondary user corresponding to one or more categories of preferences. The virtual agent then assigns relative weightage to preferences within a category among categories of preferences. Subsequently, the virtual agent generates one or more suggestions corresponding to the event based on the relative weightage.

Further, a system configured to assist in customer service is provided. The system comprises a database comprising multimedia files, wherein one or more tags are associated with one or more of the multimedia files. The system further comprises a virtual agent configured to receive input from a first user and a second user; and process the received input to understand a context of the input. Further, the virtual agent identifies one or more multimedia files based on the context and the tags and shares at least one of the identified multimedia files with at least one of the first user and the second user to enable better understanding between them.

Further, a system configured to complete a transaction is provided. The system comprises a first virtual agent assisting a customer and a second virtual agent assisting an organization. The first virtual agent is further configured to receive input from the customer and process the input to determine an action desired by the customer and context of the action. Further, the first virtual agent communicates the action desired by the customer and the context of the action to the second virtual agent. The second virtual agent is configured to receive communication of the action desired by the customer and the context of the action and execute the action based on the context of the action.

Other objects, features, and advantages of the present invention will become apparent from the following detailed description. It should be understood that however, that the detailed description and specific examples, while indicating preferred embodiments of the present invention, are given by way of illustration only and various modifications may naturally be performed without deviating from the present invention.

BRIEF DESCRIPTION OF DIAGRAMS

Embodiments are illustrated by way of example and not limitation in the Figures of the accompanying drawings, in which like references indicate similar elements and in which:

FIG. 1 depicts an exemplary architecture of a virtual agent server 100 for assisting a user.

FIG. 3 depicts a flowchart of an exemplary method 300 for assisting users using a virtual agent server 100, in accordance with an embodiment.

Figure 4:
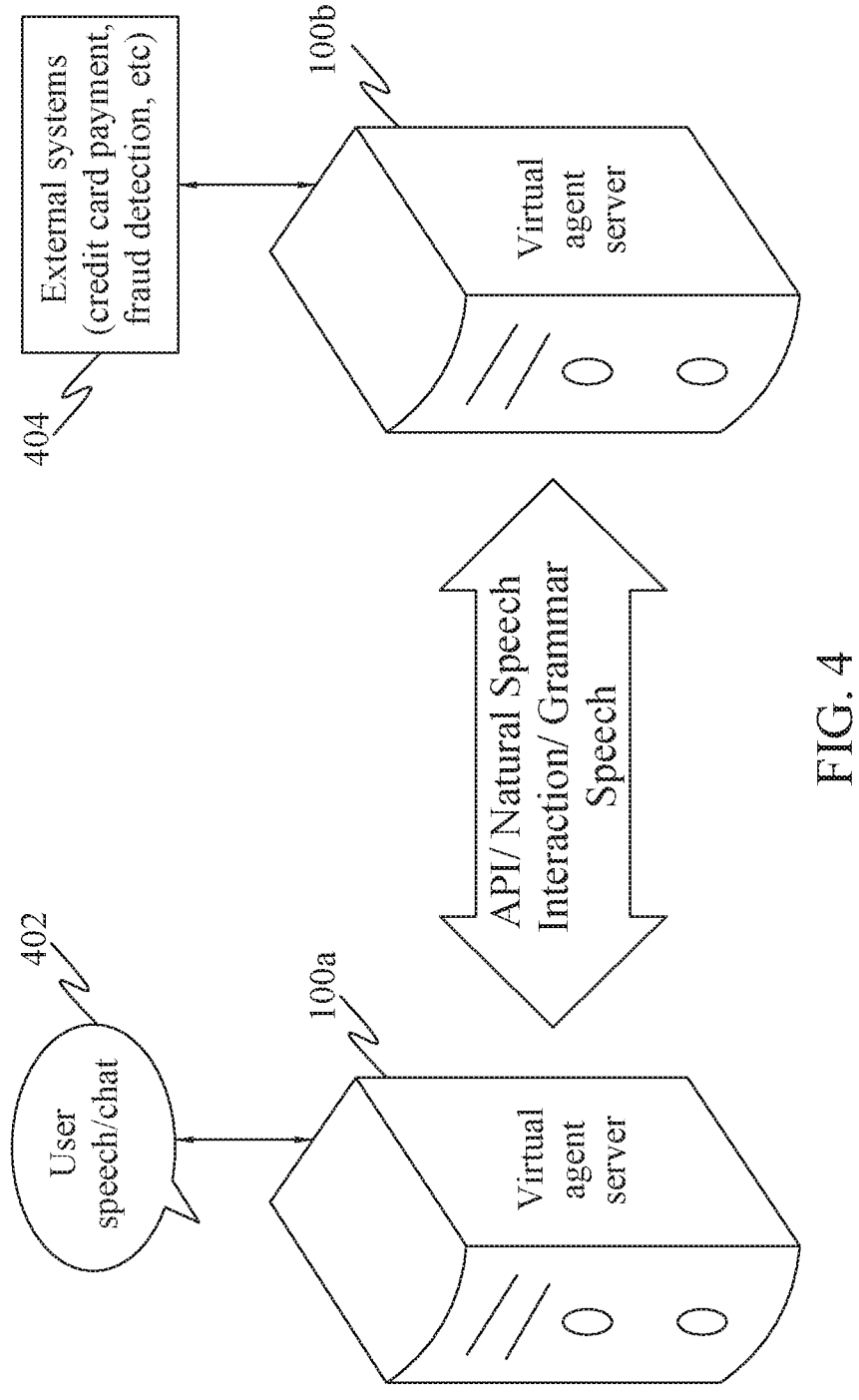
Figure 5:
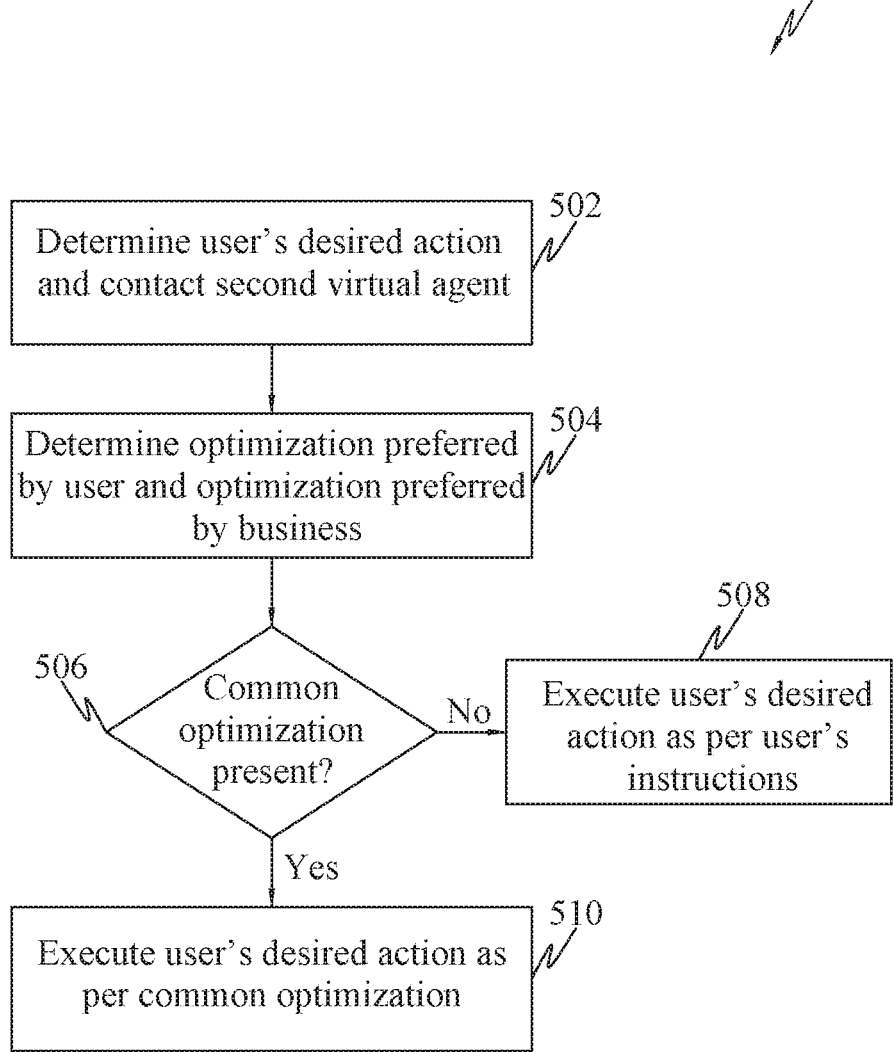

FIG. 4 depicts a system 400 including the virtual agent servers 100a and 100b for assisting a user, in accordance with an embodiment;

FIG. 5 depicts a flowchart of an exemplary method 500 for optimizing a user's desired actions, in accordance with an embodiment.

Figure 6:
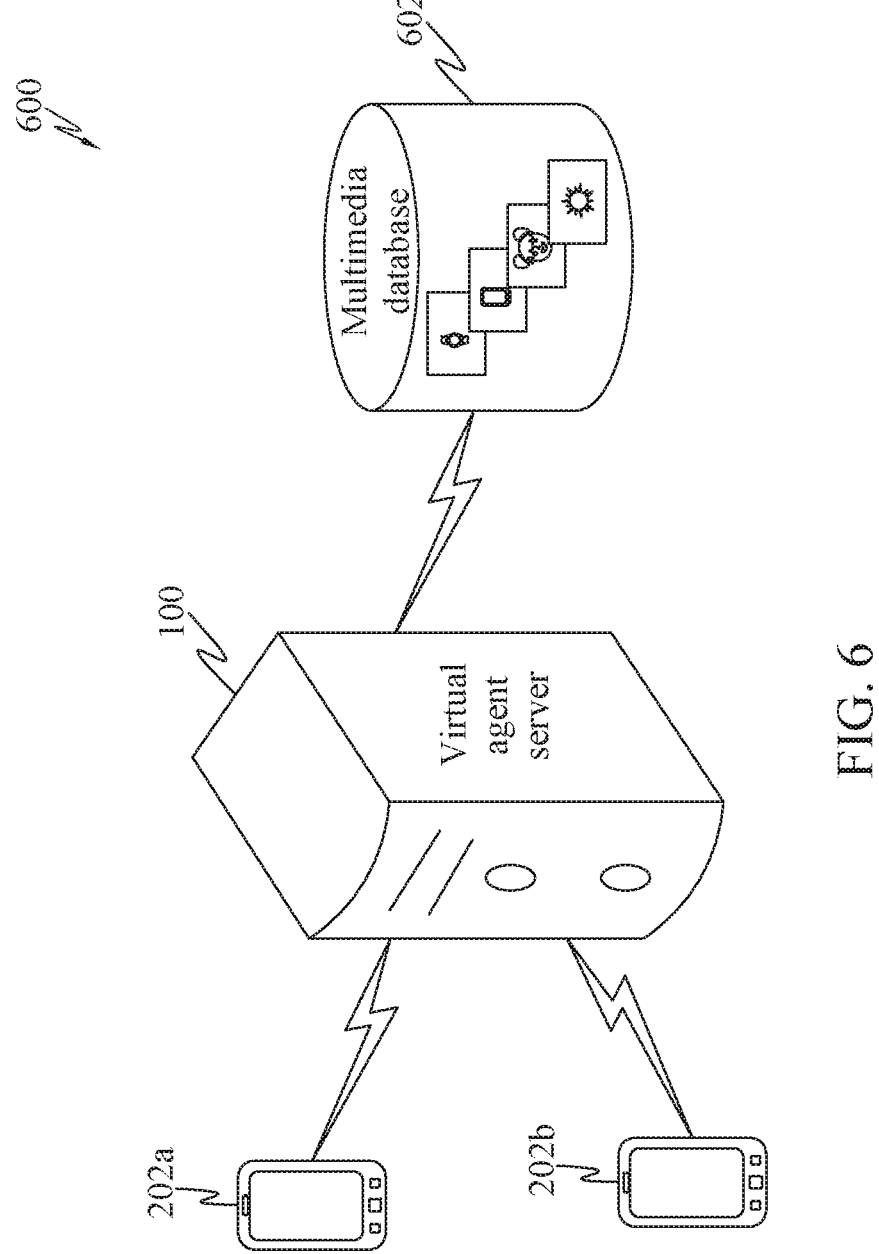
Figure 12:
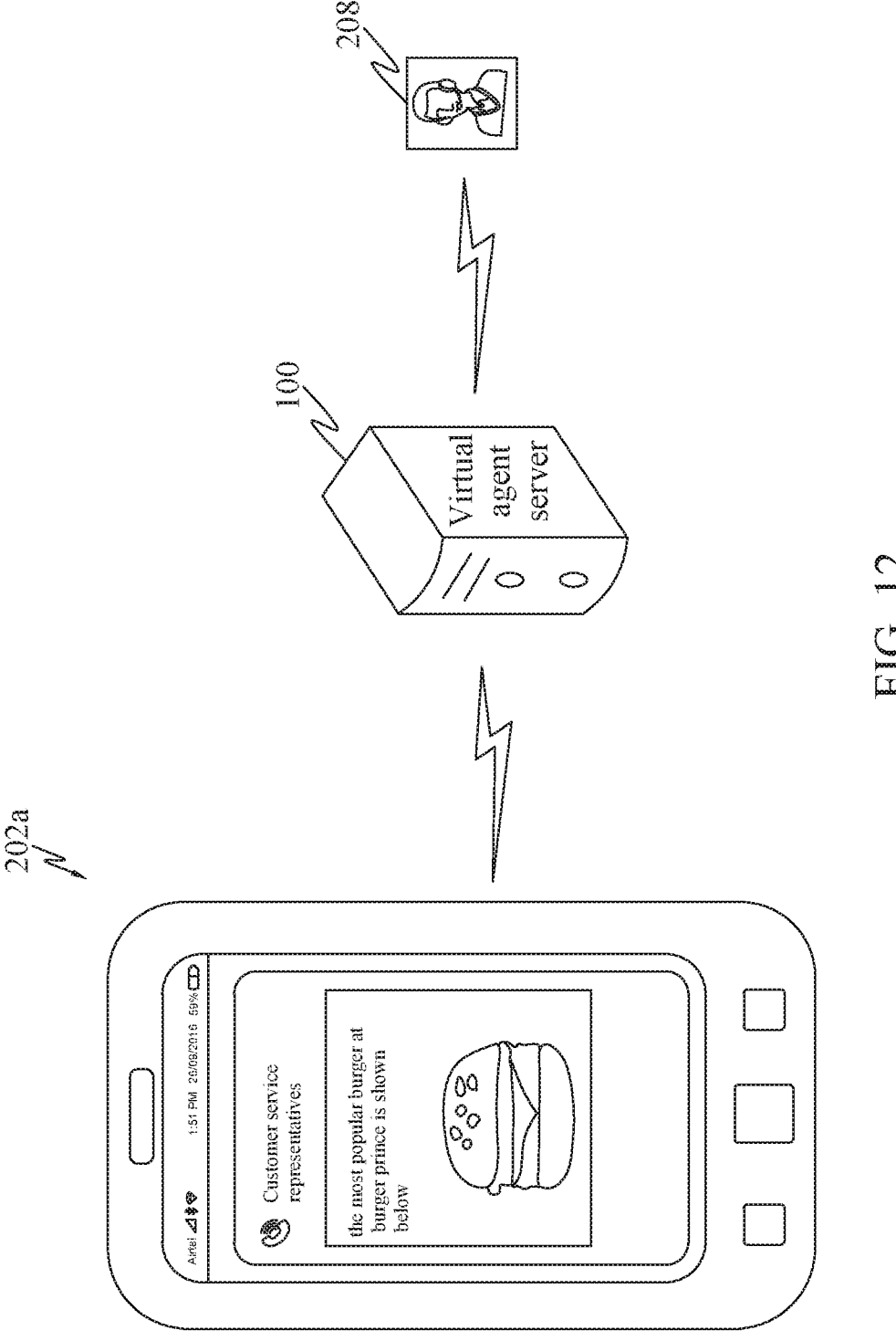

FIG. 6 depicts a system 600 including the virtual agent server 100 for assisting users, in accordance with an embodiment;

FIG. 7 depicts a flowchart of an exemplary method 700 for assisting users using a user's mobile device 202, in accordance with an embodiment;

FIGS. 8-11 depict exemplary user interfaces for assisting users using a user's mobile device 202, in accordance with an embodiment; and FIG. 12 depicts a system including the virtual agent server 100 for assisting users in a conversation with a customer service representative 208, in accordance with an embodiment.

DETAILED DESCRIPTION OF THE INVENTION

The following detailed description includes references to the accompanying drawings, which form part of the detailed description. The drawings show illustrations in accordance with example embodiments. These example embodiments are described in enough details to enable those skilled in the art to practice the present subject matter. However, it will be apparent to one of ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a non-exclusive "or," such that "A or B" includes "A but not B," "B but not A," and "A and B," unless otherwise indicated.

It should be understood that the capabilities of the invention described in the present disclosure and elements shown in the figures may be implemented in various forms of hardware, firmware, software, non-transitory recordable medium or combinations thereof.

Overview

The embodiments disclose techniques used to solve problems in communication between multiple entities with the help of a virtual agent server 100. A virtual agent server 100 can help a user and a group of people to decide on a task. Sometimes, when there are a number of people involved in an activity, deciding on a single course of action becomes difficult due to the differences in opinions of the people involved. In such a case, a user can use the virtual agent server 100 to help in deciding on an acceptable course of action. The virtual agent server 100 can understand natural speech and will determine preferences of people who are parties to an event. It will then come up with overall best-suited suggestions by taking everyone's preferences into consideration. The user and other people involved can choose whichever suggestions they prefer, and the virtual agent server 100 will execute the selected suggestions based on the feedback of the user and others. Further, the virtual agent server 100 can search for multimedia files that are relevant to the suggestions and share them with the user. The virtual agent server 100 can also communicate with external applications to optimize and execute the user's desired actions such that the optimizations are in favour of the user.

The disclosed system may be used in any chat, voice or phone-based communication. The virtual agent server 100 can identify multimedia files such as images, audio and video clips that are relevant to the topic of communication. Further, the virtual agent server 100 can stream or share the identified multimedia files with one or more users. Hence, the virtual agent server 100 can be used for event planning, task planning, customer support, and other related applications.

Further, the embodiments disclose techniques used to solve problems in customer service with the help of virtual agent servers 100. A virtual agent server 100 can help a user who has contacted a customer service representative.

Virtual Agent System

FIG. 1 represents an exemplary architecture of a virtual agent server 100, in accordance with an embodiment. The virtual agent server 100 may include a Natural Language Understanding (NLU) module 102 to understand the speech of the users, a preference module 104 to determine preferences of the users, a location module 106, a suggestion generation module 108, a controller module 110, a security module 112, a multimedia module 114, an execution module 116 and an optimization processor module 118.

The virtual agent server 100 may receive input identifying a primary user and one or more secondary users, wherein the primary user and the secondary users are parties in an event that needs coordination between the primary and secondary users. Further, the virtual agent server 100 may receive one or more inputs to identify one or more preferences of the primary user and the secondary user. The preferences may correspond to one or more categories of preferences. Subsequently, the virtual agent server 100 may assign one or more relative weightage to preferences within a category and generate one or more suggestions for the primary and secondary users based on the relative weightage. The virtual agent server 100 may then communicate with the primary and secondary users to help them execute their selected suggestion.

In an implementation, a primary user may communicate with the virtual agent server 100 using their user's mobile device 202a. The primary user may request the virtual agent server 100 to initiate communication with one or more secondary users using their mobile device 202b in order to include them as a party in the event being coordinated by the primary user. Alternatively, the primary user may contact one or more secondary users by themselves as depicted in FIG. 8.

In an implementation, the Natural Language Understanding Module 102 (hereafter called NLU module 102) may be used by the virtual agent server 100 to understand the natural speech of the primary or secondary users.

In an implementation, the NLU module 102 may receive the primary and/or secondary user's natural speech as an input. This natural speech may be in the form of audio or text. Further, the NLU module 102 may parse information from the primary and/or secondary user's natural language speech in order to collect information about the primary and/or secondary user's desired action and context of the desired action.

In an implementation, the input to the NLU module 102 may be received through one or more of the following situations: the primary user may communicate with the virtual agent server 100, or with one or more secondary users. The input may further include inputs received from the primary or secondary users in previous conversations. The NLU module 102 may generate text from the primary or secondary user's speech. In an implementation, the virtual agent server 100 may label parts of the text of the primary or secondary user. These labels may be used by the virtual agent server 100 to understand the speech of the primary or secondary users.

In an implementation, for example, in case the user comments "I'm looking for Indian restaurants which are close to my house", the virtual agent server 100 may label "looking for" as 'desired action', "restaurants" as 'desired event', "Indian" as 'desired cuisine', and "close to my home" as 'desired distance'.

The labels for the text may be generated using Hidden Markov Models or Conditional Random Field models. Alternatively, the NLU module 102 may use one or more slot-filling algorithms or manually configured rules or natural language analysis or a machine learning classifier to determine the primary or secondary user's desired action and context from the primary or secondary user's natural speech. Subsequently, the NLU module 102 may communicate the primary or secondary user's desired action and context to other modules of the virtual agent server 100.

The preference module 104 be used to determine the preferences of the primary or secondary users. These preferences may be used by the virtual agent server 100 to create relevant suggestions for the primary or secondary users.

In an implementation, the preference module 104 may receive inputs from other modules of the virtual agent server 100 and process the inputs to determine the preferences of the primary and secondary users.

In an implementation, the preference module 104 may also determine one or more preferences of the primary user and/or the secondary user based on a conversation between two or more of, the primary user, the secondary user and the virtual agent server 100. The conversation may be a present conversation or one or more past conversations which may be received from an external database or server. The virtual agent server 100 may identify one or more preferences based on the frequency of certain words used in the conversation. Further, the virtual agent server 100 may assign weightage to the preferences based on the frequency of the words used in the conversation.

Further, the preference module 104 may communicate with one or more databases to receive a history of the primary or secondary users. The preference module 104 may represent the preferences of the primary or secondary users by creating a matrix of their preferences along one or more parameters.

In an implementation, a representative location of the entire group of primary and/or secondary users may be derived from a conversation history or from the primary and/or secondary user. In another implementation, a centroid may be computed by laying out the longitude and latitude of the primary and/or secondary users.

In an implementation, the preference module 104 may convert the strength of the user's preferences into a number. The strength of the user's preferences may be measured by features such as frequency of usage of the preference, tone of voice, pitch of voice, frequency of repeated words, history or social profile of the primary or secondary users, among others. Weightage may be assigned to one or more preferences based on the above mentioned features. A weighted table may be constructed for the primary and secondary users by considering their user preference scores and frequency of the preferences of the primary and secondary users.

In an implementation, the location module 106 may be used to receive or determine one or more location information related to the primary or secondary users. The virtual agent server 100 may use this location information as a preference to generate suggestions for the primary and secondary users.

Further, the location module 106 may communicate the determined locations of the primary and secondary users with other modules of the virtual agent server 100.

In an implementation, the location of the primary and secondary users may be derived from a previous or present conversation between at least two of the primary user, secondary user, and the virtual agent server 100. Alternatively, the location of the primary or secondary users may be determined based on the GPS location information of the primary and/or secondary users' mobile devices 202a, 202b.

In an implementation, the location information of the primary or secondary users may include one or more current locations where the primary or secondary users are currently present at. Further, the location information may include an address of a preferred location, wherein the virtual agent server 100 has determined, using the preference module 104, that the primary or secondary user shows preference for the preferred location over other locations.

In an implementation, the location information shared by the location module 106 with other modules may include an address of one or more locations of consensus. The virtual agent server 100 may be configured to determine one or more locations of consensus as explained below. These locations of consensus may be determined based on the location information corresponding to the primary user or the secondary user. Further, the suggestions may also be based on the locations of consensus.

In an implementation, the suggestion generation module 108 may take into consideration the different preferences of the primary and secondary users to generate suggestions that may be used by the primary and secondary users.

In an implementation, the suggestion generation module 108 may receive information from the other modules of the virtual agent server 100. The suggestion generation module 108 may receive location information from the location module 106 and preference information from the preference module 104. Further, the suggestion generation module 108 may receive information regarding the desired action and context of the desired action of the primary user from the NLU module 102.

In an implementation, the suggestion generation module 108 may take the preferences of the primary and secondary users; and receive a user profile and/or a user history from one or more databases. Further, the suggestion generation module 108 may process the received information to generate suggestions applicable to the primary and secondary users; and rank the generated suggestions so that the virtual agent server 100 may suggest the higher ranked suggestions before the lower ranked suggestions. To generate suggestions, the preferences of the primary or secondary users may be converted into a single user vector for search and recommendations use cases. The user vector may comprise elements that hold information representing one or more of the location of the various users, set of preferences of the primary or secondary users, and history of the users, amongst others. A group user vector may then be used to rank the elements, which may be further used during various actions such as search and suggestion, among others.

As an example, the suggestion generation module 108 may create a user vector for a user 'Dan' as shown below. The desired action and context of user Dan may be to locate a restaurant where he may have lunch. One or more information about user Dan received from databases and present and previous conversations comprising location information and food preferences may be included in the elements of the user vector as follows:

User Dan:
  location: {37.4292 N, 122.1381}
  preferences: {Italian 4.1}, {Thai 3.5}, {Indian: 2.0}
  favourite_dishes: {Lasagne 10.1}, {Drunken Noodles 8.5}

In an implementation, in case the group size comprising the primary and secondary users increases, there may not be many preferences that match the interest of all users. In this case, the suggestion generation module 108 may construct a query with less number of restrictions to get a higher number of suggestion results. This query may result in one or more suggestions that may be preferred by more primary or secondary users. Further, the suggestion generation module 108 may rank the results of this query. Subsequently, the ranked results may be suggested to the primary and secondary users. The suggestion generation module 108 may use one or more of the following methods to rank the suggestions.

In an implementation, the first iteration of ranking may be done by an algorithm such as a simple Euclidean distance between a combination of user and query vector and result vector. Further, the second iteration of ranking may use an expensive Gradient Boosted Decision Tree learn to rank algorithm with features from the user vector.

In another implementation, the ranking may be generated by communicating with one or more contacts of the primary or secondary users and requesting them for their advice or opinion to identify one or more suggestions. The contacts of the primary user may be retrieved from one or more social networks or from a contact list on the primary user's mobile device 202*a*. In case the primary user has not given any explicit input regarding which contact's opinion is to be requested, the virtual agent server 100 may rank the contacts of the primary and/or secondary users in social network/contacts to optimize the requesting process for a timely feedback from the contacts. Further, one or more contacts may be selected based on the ranking to receive their opinion or advice regarding the preferences of the primary or secondary users. In an implementation, ranking of social contacts may use a Gradient Boosted Decision Tree learn to rank algorithm.

In an implementation, the virtual agent server 100 may decide to ask the primary user for feedback in case the primary user has explicitly asked the virtual agent server 100 to do so. Alternatively, the virtual agent server 100 may run a machine learning classifier to determine if it needs to contact other users to get feedback on the restaurant in the conversation.

In an implementation, the suggestion generation module 108 may be configured to determine one or more locations of consensus. These locations of consensus may be locations which may be acceptable by a majority of the primary and secondary users. These locations of consensus may be determined based on location information corresponding to the primary user or the secondary user. Further, the suggestions generated by the suggestion generation module 108 may also be based on the locations of consensus.

In an implementation, the suggestion generation module 108 may further communicate with other external systems 404, such as social network platforms 210, related to the primary or secondary users to collect information that may help in generating suggestions. In an embodiment, the suggestion generation module 108 may communicate with a calendar application on the primary and/or secondary user's mobile device 202*a*, 202*b* to determine the time and date of the user's free time or appointments. Further, the suggestion generation module 108 may communicate with external applications such as Google maps to determine estimated time, locations and routes. Such information collected from external systems 404 may be used to generate suggestions for the primary or secondary users.

As an example, the primary user may like an Indian restaurant which is 5 miles away. The virtual agent server 100 may have contacted one or more external systems 404 and determined that there is an accident on route to the restaurant. Further, the virtual agent server 100 may have communicated with the calendar application of the primary and/or secondary user's mobile device 202*a*, 202*b* and determined that the primary or secondary user has a meeting scheduled in 10 minutes. In this case, the virtual agent server 100 may alert the user that it may be tough for the primary or secondary user to attend the meeting if he chooses that Indian restaurant. The virtual agent server 100 may generate a suggestion to the primary or secondary user such as "I can show you the driving directions to the restaurant you chose but it looks like you have a meeting in another 10 minutes and there is an accident on the way. You might be late to the meeting if we proceed".

In an implementation, the generated suggestion may be communicated to the primary or secondary users as one or more of a spoken dialog, a text message or an e-mail, among others. The generation of the suggestion may be alerted to the primary or secondary user by using a spoken dialog, a ring tone or a phone vibration.

In an implementation, the controller module 110 may be used to coordinate actions between the other modules of the virtual agent server 100. The controller module 110 may comprise the main instructions to be followed by the virtual agent server 100 while taking into consideration the preferences of the multiple users and suggesting actions to be chosen by the users which may be further implemented by the virtual agent server 100.

In an implementation, the controller module 110 may determine the best alerting mechanism to be used for alerting the primary or secondary user in case of a generated suggestion. The controller module 110 may use a combination of rules configured against events and a Machine Learning/Predictive classifier to determine the type of alert that may be used in a given scenario. Some variables that may be used as input into the algorithm/rules are:

a) Is the user moving as measured by the phone location?

b) What is the type of the message? Is it a date meet or lunch meet with co-workers?

c) Is the user in an important meeting?

d) How many people are currently engaged with the user?

e) How far is the phone to the user? Is the phone in a pocket or on a table or in hand?

In an implementation, the answers to one or more of these questions may be measured by tracking the time lag between changes in the position of a user's mobile device 202. For instance, in an example it may take an approximately constant time for the primary or secondary user to move user's mobile device 202 from his pocket to his hand and complete an unlock action or click action on the screen of the user's mobile device 202. The virtual agent server 100 may keep a track of time periods when the user may have put the user's mobile device 202 down. Alternatively, the virtual agent server 100 may instruct a user's mobile device 202 sensors to log metadata information about the surroundings of the user's mobile device 202.

In an implementation, the controller module 110 may determine that the virtual agent server 100 may have stopped communication with the user's mobile device 100. This may have occurred either due to network failure or server mal-functioning. In such scenarios, in an implementation there may be a virtual agent client 212 on the primary and/or secondary user's mobile device 202a, 202b wherein the virtual agent client 212 may have a preconfigured time period to receive a response from the virtual agent server 100. In case the virtual agent server 100 does not respond within the preconfigured time period, the virtual agent client 212 may make decisions with the available information using one or more software codes and data lookup tables stored locally on the user's mobile device.

In an implementation, the virtual agent client 212 on the primary and/or secondary user's mobile device 202a, 202b may push data and logical steps needed for the user to make decisions about the generated suggestions in case the virtual agent server 100 has stopped communication with the user's mobile device 100 due to low or no network. The virtual agent client 212 on the primary and/or secondary user's mobile device 202a, 202b may push the data and the logical steps of the virtual agent process either as a periodic process or after running a machine learning classifier using features such as user location and network availability in the location.

In an implementation, the code may be a JavaScript code for the virtual agent client 212 to execute, wherein data may be stored in a nested hashmap structure. The hashmap data structure may assign unique keys to values to be stored. The values may be stored in a map by forming a key-value pair. The values may be retrieved at any point by passing the assigned key through an appropriate command.

As an example, consider a user trying to find a restaurant when the virtual agent server 100 may stop communicating with the primary and/or secondary user's mobile device 202a, 202b:

User: "I am looking for an Indian Restaurant"

Virtual agent server 100: "It looks like you are around Fremont. Based on your food taste, you might like food from the restaurant Shalimar" (Virtual agent server 100 may show pictures of dishes at Shalimar in the conversation using implementations discussed above)

User: "Call Shalimar"

Further, the virtual agent server 100 may stop communication with the user. The virtual agent client 212 may determine that there is no connection to the virtual agent server 100. The virtual agent client 212, based on the context of user location and network type might run a Machine Learning classifier algorithm and execute the action instructed by the user. In this case, when the user says "Call Shalimar", the virtual agent client 212 may forward the phone number of the selected restaurant and the code to call the phone number to the user's mobile device 100. The user's mobile device 100 may then initiate a call to the restaurant "Shalimar" when the user says "Call Shalimar", even though it can't communicate with the virtual agent server 100.

The discussed implementations may be applicable to all customer-to-business interactions including one or more of buying products on retail websites and buying airline tickets, among others. The disclosure discusses techniques in the context of natural speech interaction between users and virtual agent servers 100. These techniques may be easily extended to natural text interactions as seen in conventional chat applications.

In an implementation, the security module 112 may be used to maintain the security of the user. The virtual agent server 100 may ensure that the security of the primary or secondary users is not breached. This may be accomplished by not sharing any unnecessary or extra information while completing the primary or secondary users' request while matching the questions against slots. Further, the security module 112 may restrict revealing any extra information unless explicitly approved by the primary or secondary user.

In an implementation, the multimedia module 114 may be used by the virtual agent server 100 to search and share multimedia files and suggestions with the primary or secondary users to give them a better understanding of the generated suggestions. The virtual agent server 100 may stream one or more multimedia such as images, files, audio or video, among other multimedia related to context of the conversation. In an implementation, this may be accomplished by training a Convolutional Neural Network with tagged multimedia files.

In an implementation, the multimedia module 114 may be used by the virtual agent server 100 to identify one or more multimedia files that the user may be interested in based on the user's intent from one or more text-based chat and/or phone communication. Further, the multimedia module 114 may share the identified multimedia files with one user and receive that user's feedback regarding the identified multimedia files. Subsequently, the multimedia module 114 may share one or more of the identified multimedia files with another user based on the feedback received. The multimedia files and textual tags may be stored in a database as explained below in FIG. 6.

In an implementation, the execution module 116 may be used by the virtual agent server 100 to receive and process feedback from the primary and/or secondary users corresponding to the generated suggestions. Further, the execution module 116 may execute one or more of the suggestions that have been selected by the primary or secondary users using the feedback and the context derived from the natural speech of the primary or secondary users. The virtual agent server 100 may receive feedback from the primary or secondary users regarding the generated suggestion that they may have selected. In case the selected suggestion may be executed without contacting any external system 404, the execution module 116 may directly initiate the execution of the selected suggestion.

In an implementation, there may be situations wherein the virtual agent server 100 may need to communicate with one or more external systems 404 in order to execute the selected suggestion. In this case, the execution module 116 may first determine the type of external system 404 it needs to communicate with.

In an implementation, the external system 404 may be a software application comprising a web application 206 or it may be a natural person such as a customer service representative 208. In case the execution module 116 has determined that it needs to contact an external web application 206, the virtual agent server 100 may call an external Application Programming Interface and execute the selected suggestion with the parsed parameters from the natural language speech of the primary or secondary users. In case the external system 404 doesn't comprise of an Application Programming Interface, the execution module 116 may need to search for a phone number or customer service application related to the external system 404 in order to execute the suggestion selected by the primary or secondary users.

In both cases, the execution module 116 may need to collect one or more parameters related to the context of the execution. These parameters may include one or more of conversation summary, user's first name and last name, time, date, location and operating system of the primary and/or secondary user's mobile device 202a, 202b, among others. The possible ways in which this information may be collected are follows:

a) Question and Answering problem: In this implementation, the context, conversation history and inference from the conversation are used for answering a query regarding the value of the parameter for the Application Programming Interface. Attributes such as meta-data of the Application Programming Interface and the collected parameters are used to construct the question. In an implementation, this may be done by using manually developed pattern matching rules. Alternatively, a combination of Memory Networks, Recurrent Neural Network models with pattern matching rules may be used to answer questions for the Application Programming Interface. Crowdsourcing platforms may be used to create training data for training neural networks.

b) Slot filling Algorithms: In this implementation, slot filling algorithms may be used to figure out the parameters for the Application Programming Interface after passing the conversation context through one or more entity recognition algorithms.

c) Manual rules: Manual rules may be configured against the textual patterns using regular expressions and grammars to parse out the parameters.

In another implementation, the virtual agent 100 may determine the parameters for the Application Programming Interface call from the natural language of the primary and/or secondary user, by storing, searching, and inferring information from the user dialog history and runtime context. In an implementation, the past 'n" dialogs are retrieved and one or more words represented by tokens may be annotated with labels using entity name recognition techniques. Further, inference rules may be run on the annotated dialogs to derive any extra information, following which, parameters for the Application Programming Interface call are gathered.

In an implementation, the optimization processor module 118 may be used by a virtual agent server 100a in case it needs to communicate with another virtual agent server 100b representing an external system 404 to execute a user's actions, as depicted in FIG. 4. In this case, the optimization processor module 118 may be used to determine optimization options corresponding to the user's desired actions, communicating the optimization options with the other virtual agent server 100b, if allowed by the user. Further, the optimization processor module 118 may be used to determine which optimization option is to be executed.

Figure 2:
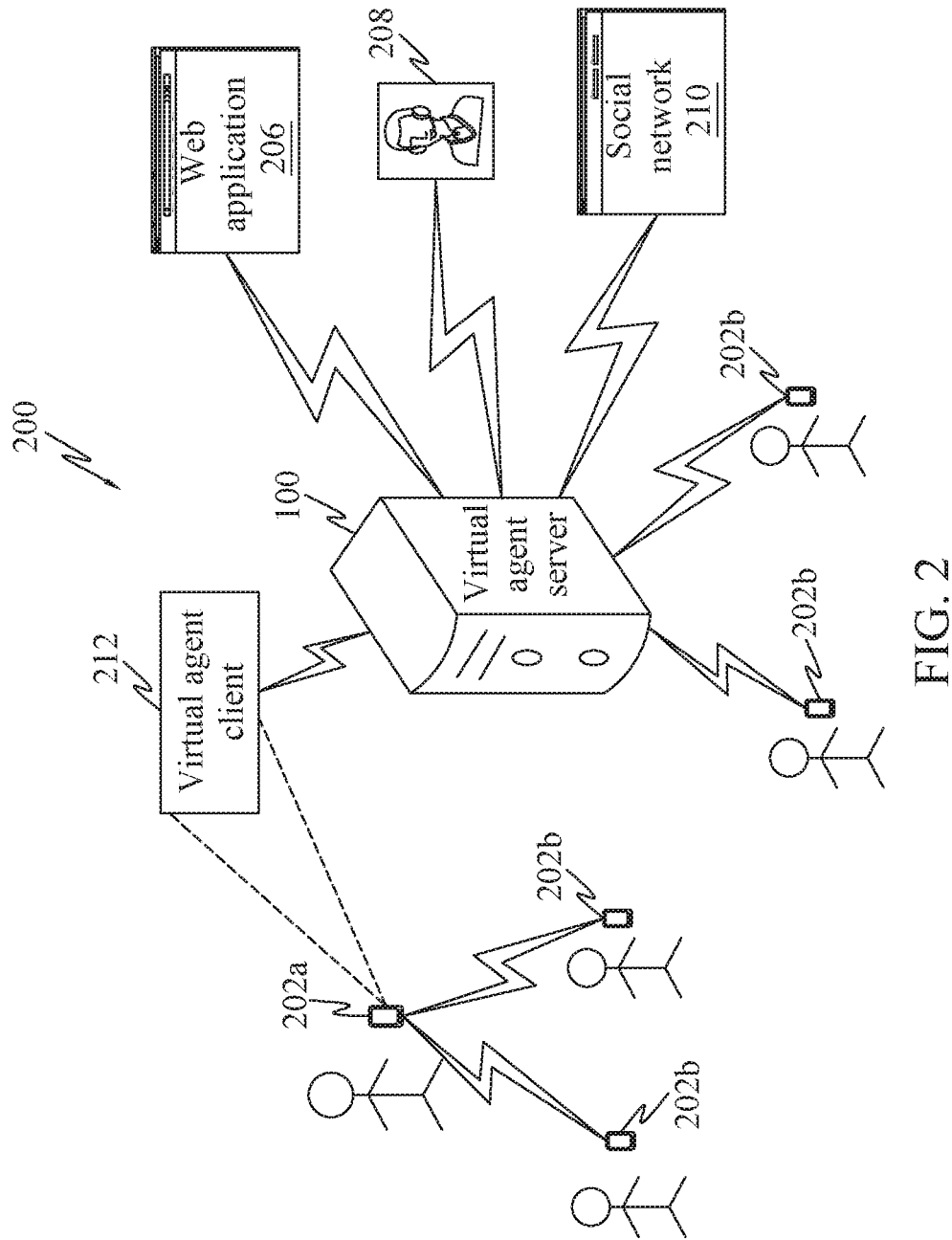
FIG. 2 depicts a system 200 including the virtual agent server 100 for assisting a user, in accordance with an embodiment.

FIG. 2 depicts a system 200 comprising a virtual agent server 100 which may communicate with primary and secondary users' mobile devices 202a and 202b; a web application 206, a customer service representative 208, a social network webpage 210, and a virtual agent client 212 as depicted.

In an implementation, the primary and secondary user's mobile device 202a, 202b may include mobile phones, palmtops, PDAS, tablet PCs, notebook PCs, laptops and computers, among other computing devices. In an embodiment, the primary and secondary user's mobile device 202a, 202b may include any electronic device equipped with a browser to communicate with the virtual agent server 100. The user's mobile device 202 may belong to a primary or a secondary user who may use it to communicate with the virtual agent server 100.

In an implementation, the primary and/or secondary user's mobile device 202a, 202b may include a virtual agent client 212 which may communicate with the virtual agent server 100 and share inputs related to the primary or secondary user with the virtual agent server 100. Further, the virtual agent client 212 may execute one or more instructions in case communication with the virtual agent server 100 has failed, as described in embodiments above.

In an implementation, the virtual agent server 100 may be implemented in the form of one or more processors with a memory coupled to the one or more processors with one or more communication interfaces. The virtual agent server 100 may communicate with one or more external systems 404 and one or more primary and/or secondary user's mobile device 202a, 202b through a communication network. It may be noted that some of the functionality of the virtual agent server 100 may be implemented in the primary and/or secondary users' mobile devices 202a and 202b.

In an implementation, the communication network may include a wired network, a wireless network, or a combination of wired network and wireless network. For example, the communication network may include local area network, wide area network, and metropolitan area network, among others.

In an implementation, the social network webpage 210 may comprise of any webpage related to a social networking application used by the primary and/or secondary users through their primary and secondary users' devices 202a and 202b.

In an implementation, the virtual agent server 100 may communicate with a primary user through their primary user's mobile device 202a and secondary users through their user's mobile devices 202b. The virtual agent server 100 may receive inputs from the primary and/or secondary users, and determine their desired action and a context of their desired action. Further, the virtual agent server 100 may determine preferences of the primary and/or secondary users, and may generate suggestions for the primary and/or secondary users. In case the primary and/or secondary users select a suggestion, the virtual agent server 100 may communicate with one or more external systems 404 such as the web application 206 or a natural person such as the customer service representative 208 in order to execute the selected suggestion.

In an implementation, the virtual agent server 100 may be required to contact the customer service representative 208 in case options are not available. The customer service for the business may be handled by a human i.e. a customer service representative 208 or by a virtual agent server 100. In both cases, the virtual agent server 100 may need to understand a natural language interaction wherein the virtual agent server 100 operating on behalf of the user may be required to answer questions about the user's desired action. In an implementation, this may be accomplished by parsing the natural language evaluating probabilities against configured slots and providing one or more answers to the customer service representative 208 or the virtual agent server 100. The virtual agent server 100 may ensure that the transaction is acknowledged. The acknowledgement may then be communicated to the user in the form of a message or notification. As an example, in case the virtual agent server 100 was required to contact the customer service representative 208 of a hotel, the virtual agent server 100 may converse with the customer service representative 208 using natural language to reserve bookings on behalf of the user as instructed, and receive an acknowledgement corresponding to the booking. Further, virtual agent server 100 may communicate the following message to the user through the primary user's mobile device 202a "The hotel bookings at Hilton for 2 days have been confirmed".

In an implementation, the virtual agent server 100 may receive inputs from a current conversation between a primary user and a customer service representative 208. The virtual agent server 100 may convert the conversation to text to generate one or more metadata such as information about the speaker and emotional response of the speaker, among others. The annotated text may then be analysed for one or more actions such as placing an order/transaction, complaints, bad customer service etc. This analysis may be done using one or more of slot filling algorithms, manually configured rules, natural language analysis for pre-configured actions or a Machine Learning classifier. The actions may then be completed by a virtual agent server 100 by calling external API's and/or making phone calls.

FIG. 3 depicts a method 300 for a virtual agent server 100 to determine one or more preferences of primary or secondary users to generate suggestions and execute the selected suggestions, in accordance with an implementation. The method 300 may be implemented by a server or an application on a primary and/or secondary user's mobile device 202a, 202b.

In an implementation, the virtual agent server 100 may be instructed by the primary user to include one or more secondary users in a conversation between the primary user and the virtual agent server 100. The virtual agent server 100 may be configured to obtain input identifying the secondary user from one or more of a phone number of the secondary user, voice characteristics of the secondary user or metadata corresponding to the secondary user, among others. The virtual agent server 100 may communicate with one or more external servers to obtain metadata corresponding to the secondary user.

At step 302, inputs from the primary and secondary users and their location information may be received or determined by the various modules included in the virtual agent server 100. Further, using previous and present inputs, the virtual agent server 100 may determine one or more preferences of the primary and secondary users as depicted at step 304. The user inputs and their preferences may be used by the virtual agent server 100 to determine one or more desired actions and the context of the actions desired by the primary and/or secondary users.

The method at step 306 comprises of receiving inputs from contacts of the primary user, regarding their advice or opinions related to the preferences of the primary user. At step 308, the virtual agent server 100 may process the preferences of the primary and/or secondary users to generate a broad query. The result of this broad query may result in one or more suggestions that may correspond to the preferences of the primary and/or secondary users. Further, as shown in step 310, the virtual agent server 100 may share one or more multimedia files with the primary and/or secondary users, wherein the shared multimedia files may be related to the generated suggestions and/or preferences of the primary and/or secondary users.

After sharing the generated suggestions, the virtual agent server 100 may receive feedback related to the suggestions from the primary and/or secondary users as shown at step 312. The virtual agent server 100 may process the received feedback to determine whether any of the suggested generations were selected by the primary and/or secondary users. In case the primary and/or secondary users did not agree on finalizing a suggestion, the virtual agent server 100 may generate further suggestions based on the feedback of the primary/secondary users as shown in step 308. In case one or more suggestions were selected by the primary and/or secondary users, the virtual agent server 100 may execute one or more actions based on the received feedback as shown at step 314.

FIG. 4 depicts a system 400 including a virtual agent server 100a assisting a user and a virtual agent server 100b assisting an organization, in accordance with an embodiment. In an embodiment, a user's actions may be executed by a virtual agent server 100a and an external system 404's actions may be executed by a virtual agent server 100b. The virtual agent server 100a may communicate with the virtual agent server 100b through an external application programming interface. In an embodiment, this communication may be in the form of one or more of natural speech interaction or machine understandable language, among others.

In an implementation, the virtual agent server 100a may receive the user's speech or chat 402 as an input from the user or other modules of the virtual agent server 100. Subsequently, the virtual agent server 100a may use the NLU module 102 to process the input to determine an action desired by the user and context of the action. The context and user's desired action may be communicated to the virtual agent server 100b and may be incorporated during execution of actions.

In an implementation, the virtual agent server 100a may determine one or more plans of action that may optimize the desired actions of the user. These optimization options may be communicated with the virtual agent server 100b representing an external system 404. The user may determine which information may be shared by using the security module 112.

In an implementation, the virtual agent server 100b may determine one or more optimization options related to the external system 404 and communicate them to virtual agent 100a. The virtual agent server 100a of the user may contact the virtual agent server 100b of the external system 404 through an external application programming interface call. The virtual agent server 100a may communicate the user's desired actions to the virtual agent server 100b. The two virtual agent servers 100a and 100b may communicate with each other to execute the desired action of the user while implementing one or more optimization options.

In an implementation, the two virtual agent servers 100a and 100b may communicate using natural language speech which may be understood by the two virtual agent servers 100a and 100b. The user's context and desired actions may be included as one or more parameters in the speech.

Alternatively, the virtual agent servers 100a and 100b may communicate via one or more application programming interfaces, wherein the user's context and user's desired action are shared as parameters in the application programming interface call.

In an implementation, the virtual agent servers 100a and 100b may communicate with one or more databases to receive further information corresponding to the user and the external system 404.

In an implementation, the user's speech may be in the form of natural language and may comprise textual words from the user received from the current conversation. In an implementation, the user's input may be taken from previous "m" conversations, where "m" is manually configured or tuned using Machine Learning for an application. The NLU module 102 may assign one or more weights to the tokens (individual words) in the speech context using Term Frequency Inverted Document Frequency (tfidf) and the recency of the communication session. The speech context may also include explicit inputs or inferences from previous speech interaction sessions decayed using recency of occurrence.

In an implementation, the virtual agent server 100b may be configured to receive and process the action desired by the customer and the context of the action to obtain input for executable action.

In an implementation, the virtual agent servers 100a and 100b may be configured to exchange optimization options of the user and the external system 404, respectively, with each other, where the optimization options correspond to the execution of the action. Further, the virtual agent servers 100a and 100b may identify if a common optimization option exists between the optimization options shared by the virtual agent servers 100a and 100b. Subsequently, the virtual agent servers 100a and 100b may execute one or more actions as per the common optimization option, in case it exists.

In an implementation, the system 400 may be configured to execute the action as per the preference of the customer in case a common preference does not exist.

In an implementation, as an example, consider a virtual agent server 100b (hereafter called $V_B$) handling the customer service of a business. A customer may order food using their own virtual agent server 100a (hereafter called $V_U$). $V_U$ may determine to place an order for one or more dishes on behalf of the user. $V_U$ may contact $V_B$ and initiate a communication session through an application programming interface call or by conversing through dialogs. The virtual agent servers $V_B$ and $V_U$ may use natural language understanding techniques to understand each other and to determine further actions from the conversation.

The payment for the order may be transferred through an online bank transaction using one of the customer's bank accounts. $V_B$ may request payment information from $V_U$ to complete the order. $V_U$ may identify one or more manually configured rules to optimize the payment on behalf of the user. As an example, $V_U$ may identify a rule to optimize for one or more parameters such as credit score, cash rewards and offers, among others, which may be applicable to the user's transaction. The manual rule may be configured either by taking the user's feedback or through $V_U$, which may configure default rules for the users. $V_B$ may comprise a rule which instructs it to prefer a credit card that charges the least transaction fees. $V_B$ may configure the default rule for the merchant. In case the user allows freedom to and $V_U$ agent to complete the transaction, $V_U$ may optimize the transaction for the user. Similarly, $V_B$ may optimize for the business.

In an implementation, $V_B$ may process one or more information corresponding to the user to determine whether they are flexible on the type of card to use to complete the transaction. In case $V_B$ and $V_U$ belong to the same entity, they might coordinate a transaction which is optimized for both the user and the business, after optimizing on their respective customers. For example, $V_U$ may decide to use any one of two credit cards $C_1$, $C_2$ belonging to the user in case they both comprise the same cash rewards and don't show any adverse impact on the credit score of the user. $V_B$ may prefer to complete the transaction with credit card $C_1$ in case it charges less on the transaction fees. Hence, $V_B$ may negotiate with $V_U$ to determine whether credit card $C_1$ may be used instead of $C_2$. $V_B$ may accomplish this by using a manual rule configured against payment transaction and requesting $V_U$ for information regarding all the credit card types owned by the customer. $V_U$ may share the user's information about the credit cards that may be use to complete the transaction after getting an approval from the user to share the information. $V_B$ may ask $V_U$ to use $C_1$ over $C_2$ for completing the transaction, by passing a list of cards it would prefer to use.

In an implementation, this may be done by using an application programming interface wherein the preferred list is passed as a list ordered by preference of credit cards. $V_U$ may then determine whether to accept $V_B$'s request regarding the preferred credit card. In an embodiment, a virtual agent server 100 may represent $V_U$ and $V_B$ and may do global optimization for both $V_B$ and $V_U$ after optimizing on their respective customers.

The discussed optimization principles may be applied to one or more types of actions including transactions such as merchandising on e-commerce platform, negotiating charges for a spa service, and negotiating hotel stay rates, among others.

FIG. 5 may depict a flowchart of an exemplary method 500 for optimizing a user's desired actions, in accordance with an embodiment. This method may be used in case a first virtual agent server 100 and a second virtual agent server 100 that represent a user and a business respectively. At step 502, the user's desired actions may be determined by the first virtual agent server 100 from one or more inputs corresponding to the user. Further, the first virtual agent server 100 may contact the second virtual agent server 100 to communicate the user's desired actions with the second virtual agent server 100.

At step 504, the first virtual agent server 100 may determine one or more optimization options preferred by the user, and the second virtual agent server 100 may determine one or more optimization options preferred by the business. Subsequently, one or more of the optimization options may be communicated between the first agent and the second virtual agent server 100 which may determine whether any optimization options are present that are common between the optimization options determined by the first and the second virtual agent server 100 as shown at step 506.

In case no common optimization options are present, the first virtual agent server 100 and the second virtual agent server 100 may proceed to execute the user's desired actions according to the instructions or context of the user, as shown at step 508. In case there are one or more common optimization options present, the first virtual agent server 100 and the second virtual agent server 100 may determine which common optimization option to execute. Further, the first virtual agent server 100 and the second virtual agent server 100 may execute the user's desired action according to the selected common optimization as shown at step 510.

FIG. 6 may depict a system 600 including the virtual agent server 100 which may share one or multimedia files with users, in accordance with an embodiment. The system may include a primary user's mobile device 202*a*, a secondary user's mobile device 202*b*, and a multimedia database 602.

The primary user may initiate communication with a secondary user. In an implementation, there may be more than one secondary user using a secondary user's mobile device 202*b* to communicate with the primary user. The multimedia database 602 may comprise one or more multimedia files, with one or more tags associated with one or more of the multimedia files. Further, the virtual agent server 100 may receive input from the primary and the secondary user, and may process the received input to understand a context of the input. Further, the virtual agent server may identify one or more multimedia files based on the context and the tags. Subsequently, the virtual agent server 100 may share one or more of the identified multimedia files with one or more of the primary and secondary user to enable better understanding between the primary and secondary user.

In an implementation, the tags may be natural language tags. Further, a convolutional neural network may be used to tag multimedia files. Alternatively, multimedia files may be tagged using one or more crowdsourcing platforms. The textual tags and meta-data corresponding to the multimedia files may be stored in a database or an inverted index to optimize the retrieval performance of the virtual agent server 100.

In an implementation, the multimedia module 114 may receive one or more of conversation context, user intent, dialog summary and speech of the user converted into text, among other information, from the NLU module 102 through the primary and/or secondary user's mobile devices 202*a* and 202*b*. The conversation context and the dialog summary may then be used to identify tagged multimedia files related to the user's intent by using information retrieval techniques. Further, the virtual agent server 100 may share the identified multimedia with one or more of the primary and/or secondary users by sharing the multimedia files through their user's mobile device 202*a*, 202*b* as explained below.

FIG. 7 depicts a flowchart of an exemplary method 700 for sharing multimedia files with primary and/or secondary users through their user's mobile device 202*a*, 202*b*, in accordance with an embodiment.

The virtual agent server 100 may receive one or more inputs from the first user and the second user as depicted in step 702. Further, the virtual agent server 100 may process the received input to determine a context of the input at step 704.

At step 706, the virtual agent server 100 may identify one or more multimedia files from a multimedia database 602 by matching the context of the user to tags assigned to one or more multimedia files. Subsequently, the virtual agent server 100 may share at least one of the identified multimedia files with one of the two users at step 708.

At step 710, the virtual agent server 100 may receive feedback corresponding to at least one of the identified multimedia files from the user with whom it is shared. The feedback may contain a selection or ranking of the identified multimedia files. Further, as shown at step 712, the virtual agent server 100 may share one or more of the selected or ranked multimedia files with the other user among the two users based on the feedback received.

In an embodiment, the first user may be a customer and the second user may be a customer service representative

208. Further, the identified multimedia files may be shared with the customer who may share their feedback regarding the identified multimedia files with the virtual agent server 100. The identified multimedia files may have been ranked for natural language context by the customer and may be shared with the customer service representative 208 who did not receive any multimedia files yet.

In an embodiment, the identified multimedia files may be shared with the customer service representative 208 who may share their feedback regarding the identified multimedia files with the virtual agent server 100. The identified multimedia files may have been ranked for natural language context by the customer service representative 208 and may be shared with the customer who did not receive any multimedia files yet. The sharing of the relevant multimedia files may aide in better understanding between the user and the customer service representative 208.

In an implementation, the virtual agent server 100 may be further configured to share at least one of the identified multimedia files in a current conversation between the first user and the second user.

In another implementation, a single image may be selected from the search results to stream to the users. The virtual agent server 100 may use one or more of a predictive algorithm or machine learning to share one or more multimedia files.

In another implementation, the multimedia file may include at least one of an image, an audio file, a video file or a document.

FIG. 8 depicts an exemplary user interface which may show the virtual agent client 212 in the primary user's mobile device 202*a*. The virtual agent client 212 may include one or more options to be selected by the user. The options may include 'Add a friend' wherein a primary user may choose to add one or more secondary users to a conversation. An 'Execute action' function may be used by the user to instruct the virtual agent client 212 about one or more actions desired by the user. In FIG. 8, a primary user has selected the 'Add a friend' option. The primary user may view a pop-up window with two options as shown. The primary user may choose the 'Select friend' option in case the primary user chooses to add a friend to the conversation by using the virtual agent client 212. Alternatively, the primary user may choose the 'Select friend' option in case the primary user chooses to add a friend to the conversation manually.

FIG. 9 depicts an exemplary user interface which may show the virtual agent client 212 present in the primary user's mobile device 202*a* after a friend (secondary user) of the primary user has been added to a conversation.

FIG. 10 depicts an exemplary user interface which may show a conversation between the primary user and secondary user on the primary user's mobile device 202*a*. In this conversation, the two users are discussing where to have lunch. The primary user and secondary user may decide to eat burgers at a restaurant near the primary user's house as shown.

The virtual agent client 212 may determine the context, user's desired actions and preferences from the conversation between the primary and secondary user's conversation as follows. The user's desired action may be to locate a restaurant, the context may be to have lunch, and the preferences may be a restaurant close to the primary user's house where burgers are available.

FIG. 11 depicts an exemplary user interface showing a virtual agent client 212 that has determined a suggestion for the primary and secondary user. The suggestion was created using the preferences of the primary and secondary user. This suggestion may be a restaurant "Burger Prince". A multimedia file comprising an image depicting the restaurant may be shared with the primary user's mobile device 202*a*. Additionally, the virtual agent client 212 may communicate with an external map application to share a map depicting a route from the primary user's house to the suggested restaurant, as shown.

FIG. 12 depicts a system including the virtual agent server 100 for assisting users in a conversation with a customer service representative 208, in accordance with an embodiment. The system depicts a user using their user's mobile device 202 in a conversation with a customer service representative 208. The virtual agent server 100 may receive the conversation as an input. Further, the virtual agent may process and comprehend the input in order to send one or more multimedia files related to the conversation. In this case, the user may have a doubt regarding what to order. Consequently, the user may ask the customer service representative 208 about the best burger available at "Burger Prince" restaurant. The virtual agent server 100 may comprehend this query and conduct an appropriate search. Further, the virtual agent server 100 may share one or more multimedia files with the customer service representative 208, who may select one image representing the most popular burger at Burger Prince. Further, the customer service representative 208 may share the image with the user on their user's mobile device 202 as depicted in FIG. 12.

CONCLUSION

The present invention overcomes the drawbacks of virtual assistant systems, by taking into consideration preferences of multiple users and generating suggestions which may be suitable to most the users. Further, the system helps to enable better understanding between a customer and customer service representative. Additionally, the system helps in selection and sharing of multimedia files between two users or between a customer service representative and a user. Thus, the present invention as discussed in this document with respect to different embodiments will be advantageous at least in optimizing the process of event coordination and execution of actions selected by multiple users. Further, it is advantageous in providing better user experience and decreasing time and effort required by users in coordinating an event. It is also advantageous in helping the user in the process of conversing with a customer representative. Additionally, the system may optimize actions for the user while trying to execute actions on behalf of the user. Additional advantages not listed may be understood by a person skilled in the art considering the embodiments disclosed above.

It shall be noted that the processes described above are described as sequence of steps; this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus, the scope of the invention should be determined by the appended claims and their legal equivalents rather than by the examples given.

We claim:

1. A system comprising:
a database comprising multimedia files, wherein one or more tags are associated with one or more of the multimedia files; and
a virtual agent server, having a processor and a memory, configured to:
receive input from a first user and a second user during a conversation between the first user and the second user;
process the received input by applying natural language analysis to determine a context of the input;
determine at least one preference of the first user and the second user based on the context, and generate a suggestion based on the at least one preference;
identify one or more multimedia files from the database by matching the context to the tags; and
share at least one of the identified multimedia files with at least one of the first user and the second user to enable better understanding between the first user and the second user,
wherein the shared multimedia file corresponds to the generated suggestion,
wherein the virtual agent server is configured to share the at least one of the identified multimedia files in the conversation between the first user and the second user through a device of at least one of the first user and the second user,
wherein the at least one preference corresponds to one or more categories of preferences,
wherein the virtual agent server is configured to assign relative weights to preferences within a category among the one or more categories of preferences based on a frequency of certain words used in the conversation; and
wherein the virtual agent server is configured to generate a target response by applying a question-and-answer model; and wherein, to generate the suggestion, the virtual agent server is configured to:
convert the determined at least one preference of the first user and the second user into a user vector;
generate one or more suggestion results using a query that is constructed using the user vector; and
rank the one or more suggestion results by using a Euclidean distance between a combination of the user vector and a query vector and a suggestion result vector, and
re-rank the one or more ranked suggestion results by applying a gradient boosted decision tree learning model to features obtained from the user vector.

2. The system according to claim 1, wherein the virtual agent server is further configured to:
receive feedback corresponding to the at least one of the identified multimedia files from the user with whom it is shared; and
share the at least one of the identified multimedia files with the other of the first user and the second user based on the feedback.

3. The system according to claim 2, wherein the feedback is at least one of selection or ranking of at least one of the multimedia files.

4. The system according to claim 2, wherein the first user is a customer and the second user is a customer service representative, wherein the multimedia files are shared with the first user based on the feedback provided by the second user.

5. The system according to claim 2, wherein the first user is a customer and the second user is a customer service representative, wherein the multimedia files are shared with the second user based on the feedback provided by the first user.

6. The system according to claim 1, wherein the multimedia file includes at least one of an image, an audio file, a video file, or a document.

7. The system according to claim 1, wherein the virtual agent server is further configured to generate information about the first user and share the generated information with the second user, wherein the generated information comprises at least one of context of the first user or actions desired by the first user.

8. The system according to claim 1, wherein the virtual agent server is further configured to:

communicate with one or more external systems to execute one or more actions based on the generated information.

9. The system according to claim 8, wherein the system is further configured to generate the information about the first user by applying at least one of a slot filling algorithm or manual rules configured against textual patterns to parse out parameters.

10. The system according to claim 1, further comprising a virtual agent client running on a user device, wherein the at least one of the functions of the virtual agent server is carried out by the virtual agent client if the virtual agent server is unavailable to the user device.

11. The system according to claim 1, wherein the conversation is text-based chat or phone communication.

12. The system according to claim 1, wherein the virtual agent server is configured to identify the one or more multimedia files by applying a neural network trained in tagged multimedia files.

13. The system according to claim 1, wherein the tags comprise natural language, and wherein a neural network is applied to tag the multimedia files.

14. The system according to claim 1, wherein the first user and the second user are parties to an event, and the suggestion corresponds to the event.

15. The system according to claim 14, wherein the suggestion includes an establishment for the event, and the shared multimedia file includes an image of the establishment.

16. The system according to claim 1, wherein the virtual agent server is further configured to execute an action corresponding to the suggestion by calling an Application Programming Interface (API) of an external web application to implement the suggestions.

17. The system according to claim 16, wherein the virtual agent server is configured to answer a query from the API by providing parsed parameters from natural language speech of the first user and the second user.

18. The system according to claim 17, wherein the parsed parameters are collected by applying a neural network.

19. The system according to claim 1, wherein the virtual agent server is configured to determine the at least one preference based on a past conversation including at least one of the first user and the second user.

20. The system according to claim 1, wherein the question-and-answer model is implemented applying a neural network.

* * * * *